United States Patent
McClellan (10) Patent No.: US 10,687,023 B1
(45) Date of Patent: Jun. 16, 2020

(54) GAMING TABLE EVENTS DETECTING AND PROCESSING

(71) Applicant: VISUALIMITS, LLC, Las Vegas, NV (US)

(72) Inventor: Ryan McClellan, Henderson, NV (US)

(73) Assignee: VISUALIMITS, LLC, Las Vegas, NV (US)

(*) Notice: Subject to any disclaimer, the term of this patent is extended or adjusted under 35 U.S.C. 154(b) by 0 days.

(21) Appl. No.: 16/102,138

(22) Filed: Aug. 13, 2018

Related U.S. Application Data (60) Provisional application No. 62/545,425, filed on Aug. 14, 2017.

(51) Int. Cl.
| | |
|---|---|
| *G06T 19/00* | (2011.01) |
| *H04N 7/18* | (2006.01) |
| *G07F 17/32* | (2006.01) |
| *H04N 5/247* | (2006.01) |
| *G06K 9/00* | (2006.01) |
| *G06Q 50/34* | (2012.01) |

(52) U.S. Cl.
CPC ......... *H04N 7/181* (2013.01); *G06K 9/00335* (2013.01); *G07F 17/322* (2013.01); *G07F 17/3241* (2013.01); *H04N 5/247* (2013.01); *G06Q 50/34* (2013.01)

(58) Field of Classification Search
CPC .... H04N 7/181; H04N 5/247; G06K 9/00335; G07F 17/322; G07F 17/3241
See application file for complete search history.

(56) References Cited

U.S. PATENT DOCUMENTS

| | | | | |
|---|---|---|---|---|
| 2002/0042298 | A1* | 4/2002 | Soltys | G06Q 10/0639 463/29 |
| 2004/0240542 | A1* | 12/2004 | Yeredor | G06K 9/00771 375/240.01 |
| 2006/0183545 | A1* | 8/2006 | Jourdian | A63F 7/06 463/36 |
| 2013/0083066 | A1* | 4/2013 | Aoki | G06T 19/006 345/633 |
| 2015/0220141 | A1* | 8/2015 | Shows | G06F 3/14 345/168 |
| 2016/0155472 | A1* | 6/2016 | Elg | G11B 27/005 386/223 |
| 2017/0039807 | A1* | 2/2017 | Shigeta | G06Q 50/34 |

* cited by examiner

*Primary Examiner* — Jonathan R Messmore
(74) *Attorney, Agent, or Firm* — Ulmer & Berne LLP (57) ABSTRACT

Systems and methods are disclosed for detecting and processing events that occur at a gaming table in a casino environment. Camera streams associated with the table game are analyzed using lightweight, watchdog processes. When a certain event is detected, extended processes can be executed in order to provide additional information regarding the event. Such as approach can require a relatively limited amount of computing resources, while still providing relevant information to casino operators. The information can be used, for example, to track gameplay and provide player ratings.

17 Claims, 7 Drawing Sheets

GAMING TABLE EVENTS DETECTING AND PROCESSING

CROSS-REFERENCE TO RELATED APPLICATION

This application claims the benefit of U.S. provisional patent application Ser. No. 62/545,425, filed on Aug. 14, 2017, entitled, "Method of Processing Events at a Gaming Table," the disclosure of which is hereby incorporated by reference in its entirety.

BACKGROUND

Playing casino table games is a popular form of entertainment. While most people on the player's side of the table view this as a simple process, on the procedural/business side, there are many processes that are being performed. For example, example procedures associated with various types of table games include counting money out at the table, distributing chips to players at the table, rating players at the table, rating unrated players at the table and notating the details of the player if they buy-in for a large amount of money and choose to be unrated (i.e., relevant to anti money laundering (AML) monitoring), and determining the outcome of a round of play.

The rating of a player is performed for understanding the value of the player and how much that player's gameplay is worth to the casino. Casinos typically desire to retain players with strong ratings. In turn, the casino can provide the player with complimentary goods or services. Many casinos utilize a "Rating System" to input the particulars for a player based on their gameplay. Factors used to establish a player's rating may include buy in amounts, average bet amount, hands played, time on table, and so forth. This process, however, becomes tedious and potentially inaccurate if a player plays multiple hands simultaneously or sits out for numerous hands. Further, this process becomes more complex and burdensome to casino staff when casinos elect to reduce the staff that handles the ratings. By way of example, in years past, a supervisor at a casino would have responsibility for handling ratings of players at four tables. In today's casinos, supervisors may be responsible for handling ratings of players at eight or more tables. This approach leaves room for error when determining how many rounds were played by a player and the amount of money the player brought out of their pocket during gameplay.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-8 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

As described in more detail below, the present disclosure generally relates to the detection and processing of events that occur at gaming tables through real time analysis and/or post processing and process management. In some embodiments, the analysis is coupled with the appendage detection in order to associate certain activities with a particular player.

Many events occur at a gaming table in a casino environment, often simultaneously. The systems and methods described herein allow for such events to be captured and analyzed using approaches to efficiently manage computing resources. Such approaches, therefore, can require a relatively limited amount of resources, while still providing relevant information to casino operators. In some example embodiments, a system can include cameras positioned proximate to the gaming table and a processor, or multiple processors, to determine events that occur. In some example embodiments, additional sensors (such as RFID sensors) are incorporated into the gaming table, or elsewhere, to provided additional information to the system. Software is applied to that image data and/or sensor date to understand these events and how to assign tasks to various processes in order to disseminate what had occurred or, in some cases, to determine what is about to occur.

Figure 1:
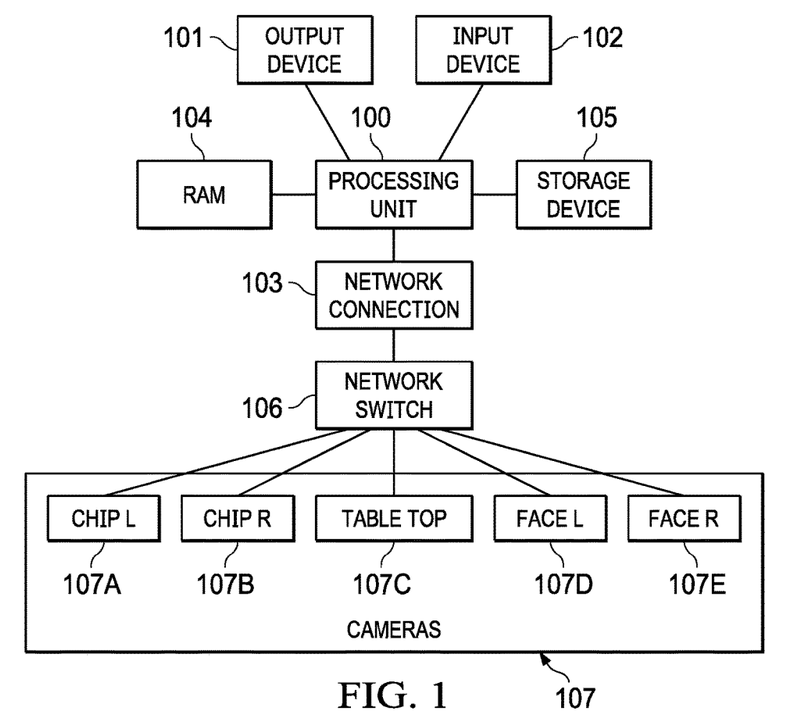
FIG. 1 depicts a block diagram of example hardware that can be used to implement the methods described herein, according to one non-limiting embodiment.

Referring first to FIG. 1, a block diagram of example hardware that can be used to implement the methods described herein according to an embodiment is illustrated. A processing unit 100 (such as a microprocessor and any associated components) can be connected to an output device 101. The output device 101 can be any device that conveys information, such as an LCD monitor, a touch screen, a CRT, and so forth. The output device 101 can be used to display any aspect of the processes to a user. The user can be, for example, casino personnel, such as a pit boss, a supervisor, a dealer, a floor manager, and so forth. The system can also include an input device 102 which can be used to input any input from the user. Any suitable form of input device 102 can be used, such as buttons, a touch screen, a keyboard, mouse, and so forth. Processes described herein can be performed by the processing unit 100 by loading and executing respective instructions. While one processing unit 100 is shown for clarity of illustration, multiple such processing units can also work in collaboration with each other, which can be in a same or different physical location. The processing unit 100 can also be in communication with a network connection 103, which can connect the device to a computer communications network such as the Internet, a LAN, WAN, and so forth. The processing unit 100 can communicate with other computers, devices, servers, etc., that are located in a same or different physical location via the network connection 103. The processing unit 100 can also be connected to a RAM 104 and a storage device 105 which can be a disk drive, DVD-drive, CD-ROM drive, flash memory, etc.

One or more cameras 107 can be connected to the processing unit 100 via the network connection 103, or via the network connection 103 and a network switch 106. While one network switch and network connection are shown, it can be appreciated that one or more such connections and/or one or more switches can work together implement the method described herein. Programs and/or data required to implement any of the methods/features described herein can all be stored on any non-transitory computer readable storage medium (volatile or non-volatile, such as CD-ROM, RAM, ROM, EPROM, microprocessor cache, etc.).

The one or more cameras 107 can view an image (still or moving), digitize the image, and transmit the data representing the digitized image to the processing unit 100 (or any other component) so it can be stored and/or analyzed. Cameras in accordance with the present disclosure can be located anywhere on or near a casino table. Each camera can be pointed in appropriate directions so that they can capture images of what objects are on the table and which players are near the table. While FIG. 1 schematically shows five cameras, namely Chip L camera 107A, Chip R camera 107B, Table Top camera 107C, Face L camera 107D, and Face R camera 107E, it is to be appreciated that other embodiments can utilize different camera arrangements without departing from the scope of the present disclosure.

Figure 2:
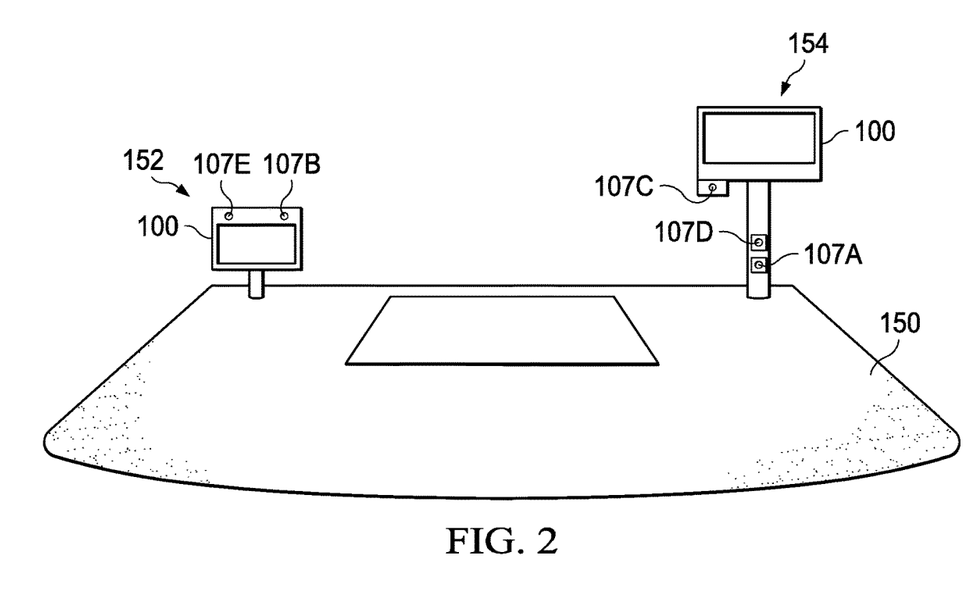
FIG. 2 schematically depicts an example table game incorporating various components depicted in FIG. 1.

FIG. 2 schematically depicts an example table game 150 incorporating various components depicted in FIG. 1. Table game 150 can be any suitable game in which a player and/or gameplay tracking is desirable, such as, without limitation, blackjack, roulette, three card poker, and baccarat. In the illustrated embodiment, a game signage device 152 is positioned on one side of the table game 150. Additional details regarding examples of the game signage device 152 can be found in U.S. Pat. No. 6,524,606, entitled "Method and system for providing dynamic casino game signage with selectable messaging timed to play of a table game," which is incorporated herein by reference. In the illustrated embodiment, a game signage tower 154 is positioned on another side of the table game 150. Various cameras can be incorporated into the game signage device 152 and the game signage tower 154. Further, the game signage device 152 can house a processing unit 100. Additionally or alternatively, the game signage tower 154 can house a processing unit 100.

Furthermore, in some embodiments, a processing unit 100 is positioned remote from the gaming table 150.

In the illustrated embodiment, the Face R camera 107E and the Chip R camera 107B are coupled to the game signage device 152. The Table Top camera 107C, the, the Face L camera 107D, and the Chip L camera 107A are coupled to game signage tower 154. As shown, the Table Top camera 107C can be positioned at a higher relative elevation than the Face L camera 107D, and the Chip L camera 107A in order to provide the desired vantage point. It is noted that some or all of the cameras can be generally obscured from view such that players may not be aware of their presence. Further, it is to be appreciated that the arrangement of cameras in FIG. 2 is merely for illustrative purposes. Other embodiments can utilize different camera arrangements without departing from the scope of the current disclosure.

Figure 3:
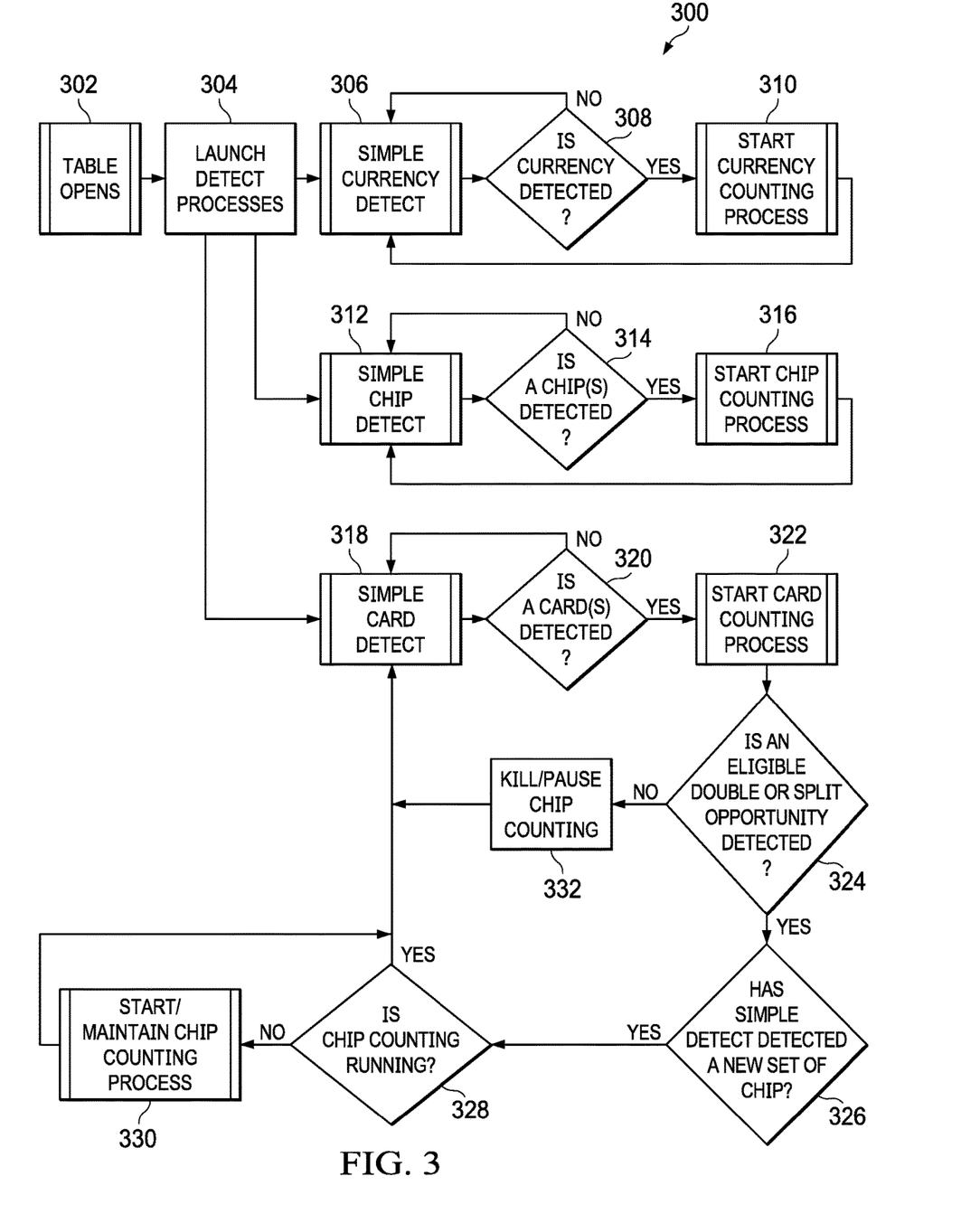
FIG. 3 depicts an example process in accordance with one non-limiting embodiment.
Figure 4:
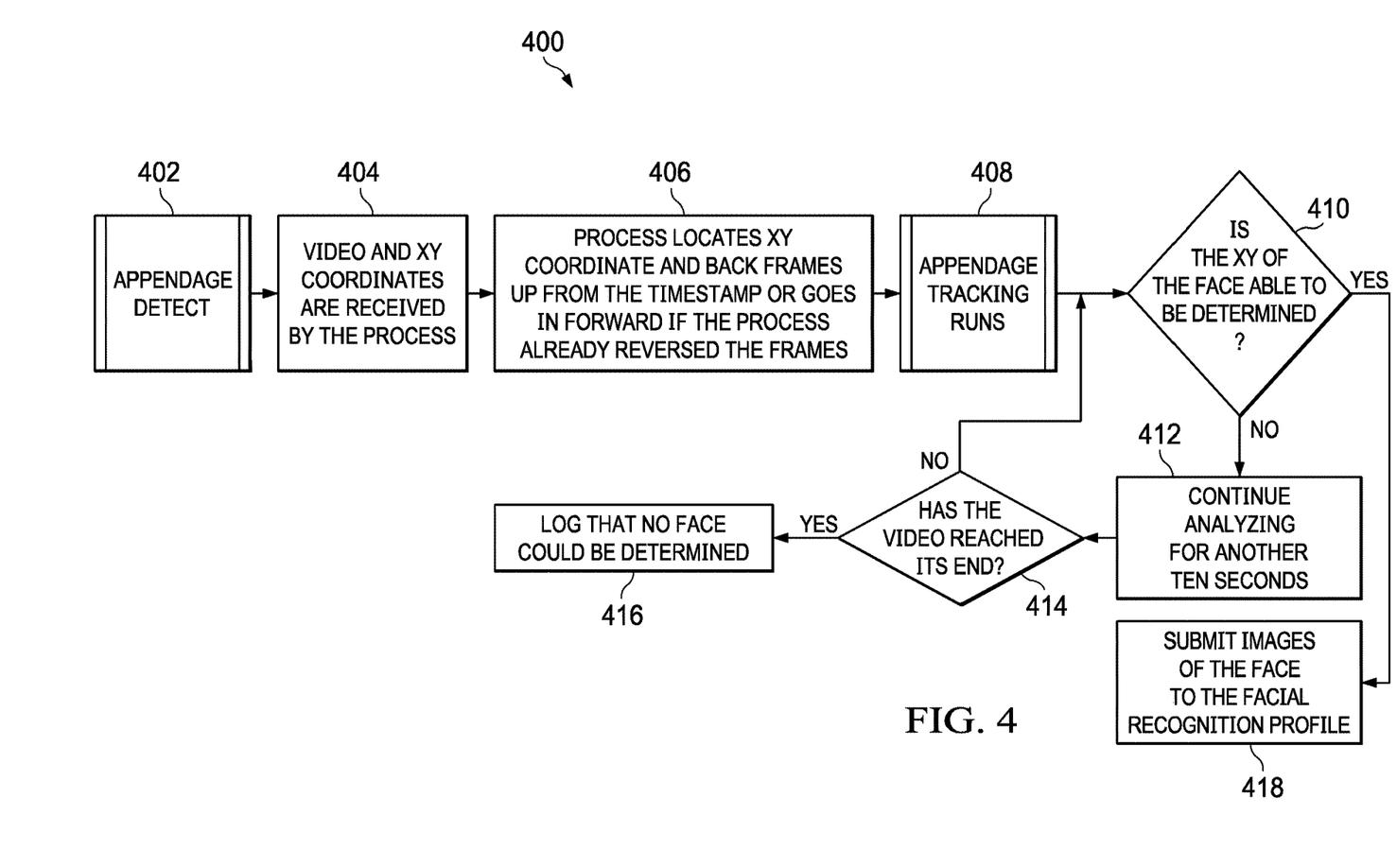
FIG. 4 depicts an example appendage detection process in accordance with one non-limiting embodiment.

The systems and methods described herein can utilize watchdog processes to provide efficient use of computer processing. As used herein, watchdog processes or "simple" processes generally refer to lightweight processes that monitor for the occurrence of a specific event. Once the specific event has been detected, additional processes, referred to as extended process, can be executed to perform further analytics. The extended processes can generally utilize more computing resources than the watchdog process. Using a combination of watchdog and extended processes seeks to conserve computing resources and limit the amount of computing resources needed to perform the desired processes. FIG. 3 depicts an example process 300 in accordance with one non-limiting embodiment. The process shown in FIG. 3 is collection of simple detection processes that are each used to detect the presence of an object utilizing images (which can include still images and/or video) collected by one or more cameras 107 (FIG. 1) associated with a table game 150 (FIG. 2). In some cases, all of the simple detection processes to run as a single process. This process or collection of processes can execute to scan the video or still image to look for key elements on the gaming table. Depending on available processing resources or other parameters, the scans can be performed at an adjustable or fixed frame rate.

For example, the systems and methods described herein can utilize computer vision techniques to detect and analyze some or all of the following associated with a gaming table 150 (FIG. 2): currency (presence and value), chips (bet position occupancy and value), faces (detection, tracking, recognition), appendages (detection and tracking), and cards (presence and value). Once an event is detected by the associated watchdog process can create a timestamp of when a detection event occurred. Depending on the event being detected, the watchdog process can note the XY coordinates (or some other location assignment) in the frame where the event occurred.

Depending on the event type, the system can then trigger a secondary process to start reviewing upcoming frames (Active). The watchdog process may define the particular camera stream or streams to review and, in some embodiments, provide instructions of which portion or portions of images to analyze. Additionally, a command can be sent to a secondary process to review previous (Past) frames stored in a buffer on a storage device or in RAM where the associated camera or cameras 107 (FIG. 1) stores its output. This analysis can be performed with video or still images.

In accordance with the present disclosure, each process may spawn separate processes or disable, kill, or pause processes. It is likely initial detection will occur with the Table Top camera 107C (FIG. 2). Thereafter the system would use secondary cameras. For instance, the detection of a new stack of chips may be performed with the Table Top camera 107C, the determination on who placed the chips may be via the camera output from Face L camera 107D, and the use of Chip L camera 107A would be used for determining the value of the chip stack. The system will use the most optimal camera for what is looking to be determined. The secondary cameras are used selected by the software and can be based on the vantage point of the camera. For instance, if the currency is detected on the left half of the gaming table the system would detect this and would choose the Face R camera 107E to detect which player put the currency down.

Referring again to FIG. 3, the depicted detection processes can continuously run at a frame rate or may be off or idle until the process is requested. FIG. 3 depicts a simple currency detection process (blocks 308-310), a simple chip detection process (blocks 312-316), and a simple card detection process (blocks 318-330). As shown, these detection processes can be executed once the table opens at block 302 and the detection processes are launched at block 304. Each of the simple detection processes can run at all times or at requested times and can also run at different frame rates, once something is detected, to determine "Active" event results. As used herein, running at a frame rate does not reflect the amount of frames the camera operates, but rather the number of frames that are processed by a process. Further, while FIG. 3 depicts a currency detection watchdog process, a chip detection watchdog process, and a card detection process, this disclosure is not so limited. For instance, other watchdog processes can be used, such as a face detection watchdog, among others.

Various processes can be utilized for detecting particular individual events. For instance, there are various approaches for determining the value of a wager that is placed in a betting circle. RFID is one example method for determining the value of chips in a betting circle. However, determining the value of the wager is not necessarily useful unless it can be applied to a person, known or not. As is to be appreciated, there are numerous types of events that need associating to a particular player at the table. These events can include buy-ins, chips played, playing two spots, doubling down, splitting, etc. The method in which an event is associated to a person can rely on the analysis of the person triggering the event, the event trigger location on the image/video, the appendages of the person, and the face of the person. For any trigger event the following processes can occur. A simple detection process or a sub process can determine a trigger event. A simple detection process or a sub process can create a timestamp. A simple detection process or a sub process can determine the XY coordinates of the trigger element and determine the optimal camera for the analysis. The simple detection or sub process can send the details and the video to an appendage detection process, as shown by example appendage detection process 400 in FIG. 4. The appendage detection process 400 can analyze frames from the buffer starting at the timestamp working backwards (blocks 402-406), determine whose appendage the trigger element was attached to (block 408), trace the appendage up to the head and determine the coordinate of the face in the frame or in the other frames (block 410-416). The appendage detection process 400 can then pass these coordinates, with the image or video, to a facial recognition process (see FIG. 7 below) to determine which person to assign the event to (block 418). The facial recognition process 700 may look at past frames, the current frame, or future frames to establish the person. In addition, the facial recognition process 700 can run constantly and always indicate where a person is at the table. Thus the appendage detection process 400 may request this information from the facial recognition process 700.

Figure 5:
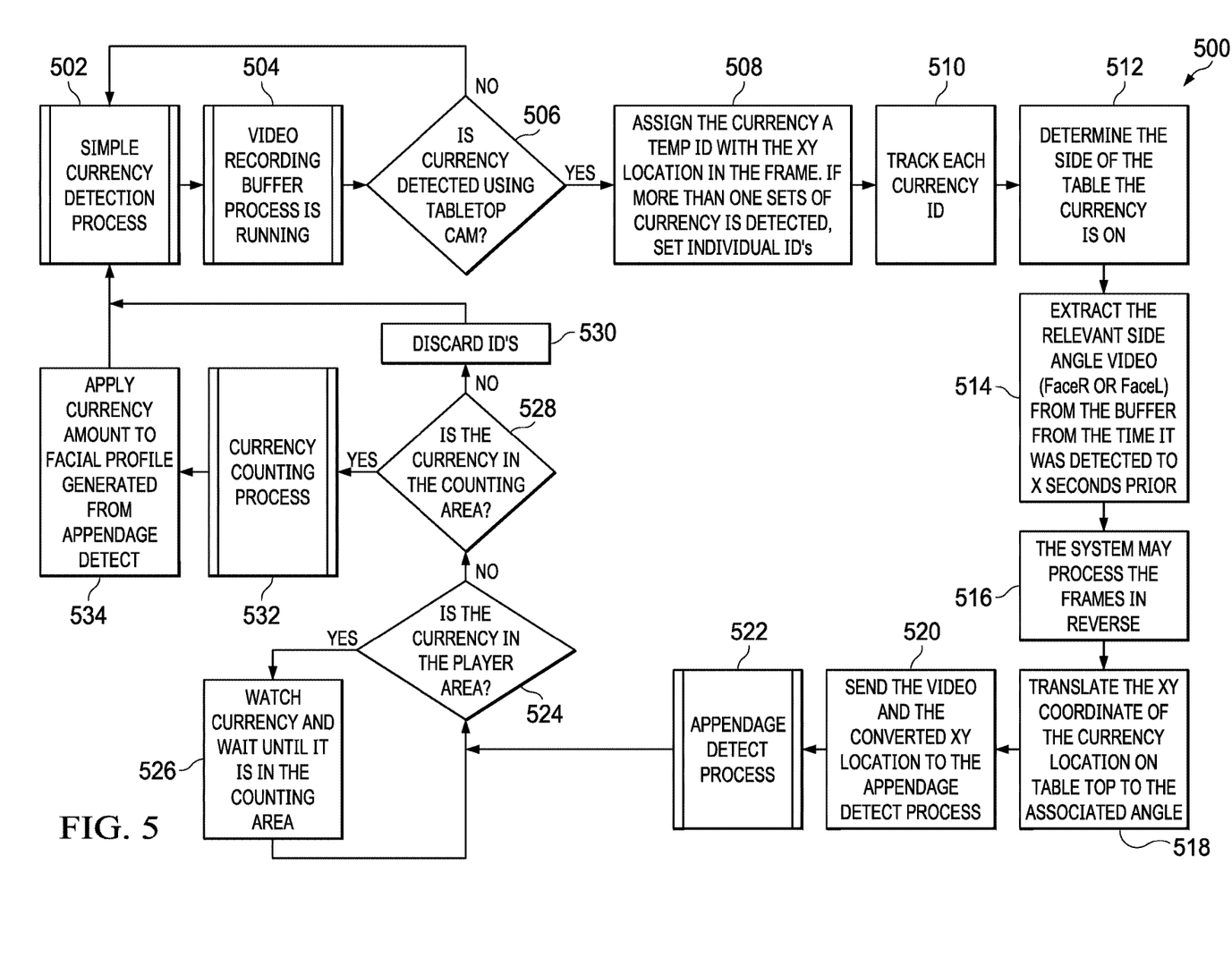
FIG. 5 depicts an example currency detection process in accordance with one non-limiting embodiment.
Figure 6:
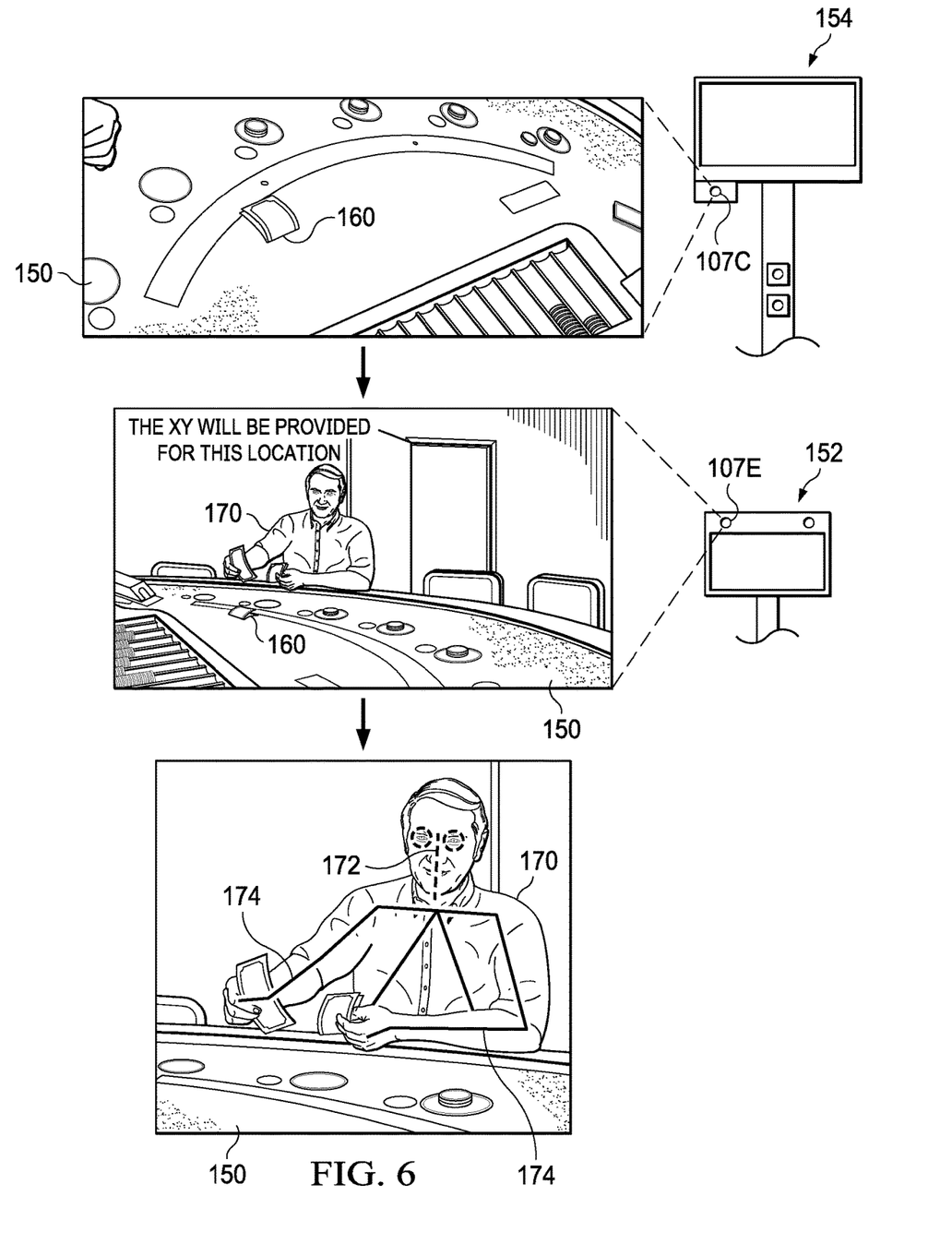
FIG. 6 provides a progression associated with currency in accordance with one non-limiting embodiment.
Figure 7:
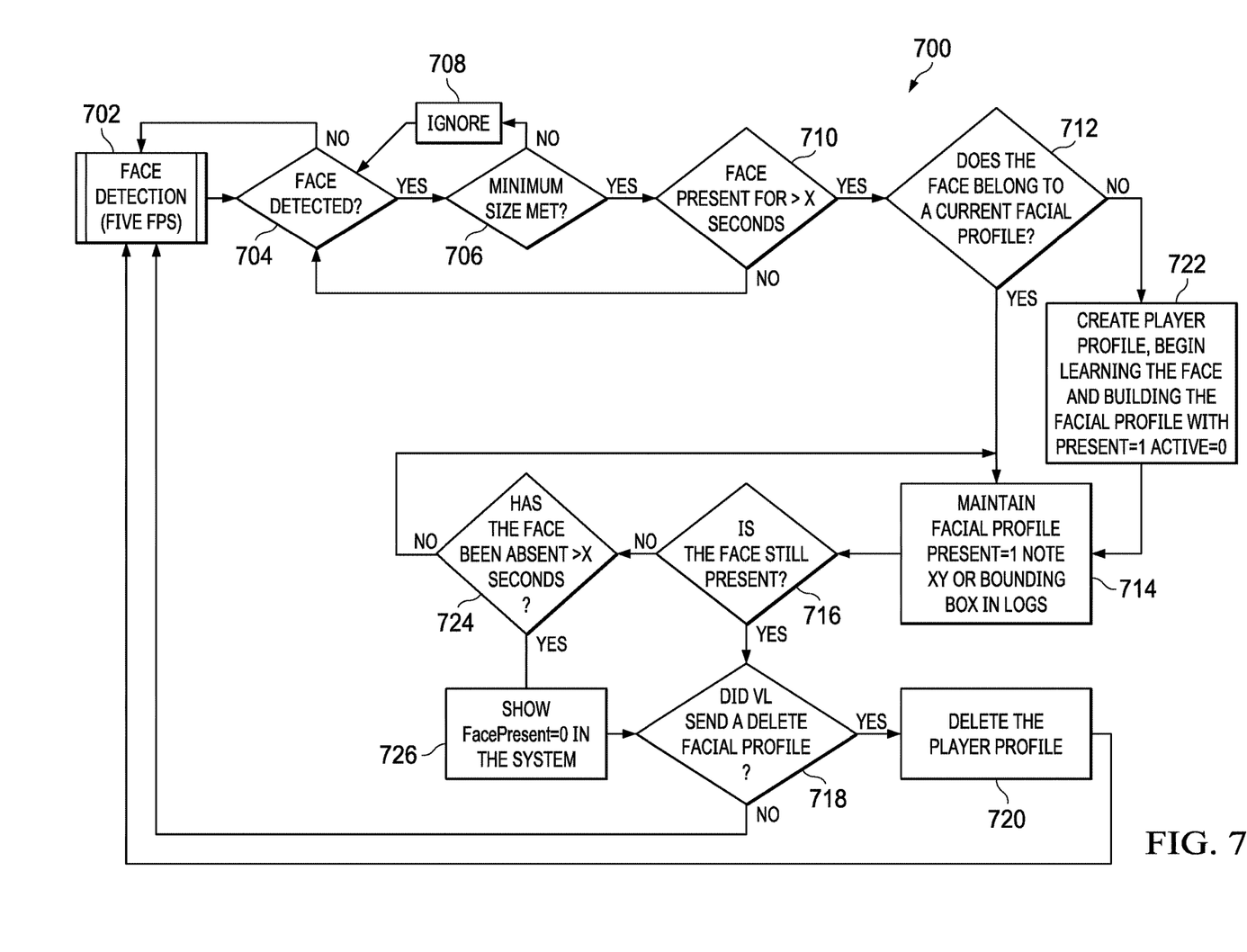
FIG. 7 depicts an example face detection process in accordance with one non-limiting embodiment.

FIG. 5 depicts an example currency detection process 500 that can be executed upon the simple currency detection process detecting a triggering event. FIG. 6 provides a progression of how the systems and methods described herein associate currency to a player 170 that is playing at a gaming table 150. Referring to FIGS. 5-6, at blocks 502-506, the process executes until currency 160 is detected using the Table Top camera 107C positioned on the game signage tower 154. At blocks 508-520, the currency 160 is assigned a temporary ID with the XY location of the currency 160 in the frame. Additionally, side angle video is extracted from the relevant camera from a buffer from the time the currency 160 was detected to X seconds prior. In the illustrated example, as shown in FIG. 6, the buffer associated with Face R camera 107E is utilized. The XY location of the currency 160 for that camera can be provided to an appendage detection process at block 522. The appendage detection process reviews previous frames to determine the face 172 the currency is associated with based on detecting the appendages 174 of the player 170 that placed the currency 160 on the gaming table 150. Frames can then be sent to a facial recognition process (FIG. 7). The system can send frames related to the face in question to a facial recognition process to determine if this is a new face or an existing face at the table. In some embodiments, the facial recognition process can be running simultaneously and provide this information in real time rather than post facto. Still referring to FIG. 5, at blocks 524-534, a currency counting process is executed once certain parameters are satisfied.

In casinos, it is common for people to walk up to the gaming table 150, sit down, play for a while, and then leave. To accurately determine who is at the table and who is triggering events, knowing the face that is attached to these events can be required. In accordance with the present disclosure, a facial recognition watchdog process can be utilized. This watchdog process may focus exclusively on facial recognition, or may encompass other watchdog processes. The facial recognition watchdog process can detect faces at a certain frame rate. The watchdog process can then compare these faces against a local database of facial profiles (e.g., found and analyzed players at the table) via the facial recognition process. If the face is not found in the local database it may send a few more frames to the face processor. If there is still no face to compare, the face learning process can go back to the buffer from the first time the face was detected and begin deep learning on the face until such a facial profile is created. Or, the process can start learning the face from the request and begin deep learning until a facial profile is created.

Once all facial profiles at the table are in the local database, so long as there are no new detections, the face learning process can be throttled or shut down and the face detect process will continue. In some embodiments, to conserve resources, it is throttled until a new event occurs at the table such as a betting circle going empty for a set duration or currency is detected.

There are other methods that can be used to determine if a player still exists at the table, such as face tracking. Face tracking may watch the faces at the table with a low level process tracking basic elements of the face. If the face, for some reason, disappears, the process will then analyze the newly appeared face to determine if it is an existing facial profile.

FIG. 7 depicts an example face detection process 700 in accordance with one non-limiting embodiment. Once a face is detected and certain parameters are met, at blocks 702-712, the process determines if the face belongs to a current facial profile. If not, at block 722, a player profile is created and the process begins to learn the face. If the face does belong to a current profile, at blocks 714-726, the facial profile is managed. The systems and methods in accordance with the present disclosure may utilize numerous cameras for numerous functions. The detection of an event may be detected with a camera that has the highest resolution of the trigger event. This, however, does not necessarily mean that this is the camera best suited for determining the facial profile to assign the event to. Triangulation may be required to submit information to the processes that may utilize a more advantageous view. In addition, there may be a secondary process that manages the cameras timing to insure that all cameras run, or the output is analyzed, where one frame from a camera matches the timing of an event from the other camera.

Below are example operational scenarios utilizing the systems and methods described herein. As is known in the art, the following routine typically occurs at a gaming table. A player walks up to a table and places money down. The dealer collects the money off the table and counts in using rules defined by the casino. The player is slid chips used for play in the amount in which the currency was exchanged. The staff may request a player's card from the player for applying the buy-in to a rating system. If the player elects not to supply a player's card the staff may enter details related to the player into the system listing their ethnicity, estimated age, clothing, etc. to track them for potential money laundering.

In accordance with the present disclosure, if a player puts money down on the table, the watchdog process or an individual process detects currency (but does not necessarily count it) and can do the following. First a timestamp for the event will be created. The XY coordinates of the event can then be determined. A forward-looking command can be send to the currency process to turn on or increase frame rate to analyze upcoming frames from that XY coordinate and count the currency as it is collected by the dealer. The system can also trigger a secondary currency counting process that would count the currency. A past-looking command can be sent to an appendage detection process with the timestamp of when the event occurred and the XY coordinates of the event in the video or image, which may be from more than one camera. The appendage detection process can do one or more of the following processes. It can review the buffer of the camera(s) frame by frame in reverse to determine the appendage that placed the currency. It can receive a video and process the frames from prior to the event up to the event to determine the appendage that placed the currency. Additionally or alternatively, it can back up the buffer directly and play it forward from a predetermined spot prior to the timestamp to determine the appendage that placed the currency.

Once the appendage detection has determined the appendage, the watchdog process or the appendage detection process can send images or videos in close proximity of the timestamp to the facial recognition process. The facial recognition process will then determine which person belongs to that location (XY) in the frame and communicate it back to the appendage detection process or to the watchdog.

In some embodiments, there may also be a tracking service that tracks the currency after it is detected as in the instance two people put money down at the same time. The currency detection process can watch the originating XY coordinate to provide back to the watchdog for assignment to the facial profile. In addition, if the source of the money is not able to be detected, the appendage detection process can log that it was unsuccessful. The fallback process can be to watch the appendage of the dealer and determine to which person the chips were delivered.

The chip delivery following a buy-in is the last process of the buy-in. Once the dealer slides the chips out to the player, the player who receives them (using appendage detection) can be the one the buy-in amount is applied to. Once the above is completed and the currency is counted, the Watchdog process can store the facial profile assigned to the buy-in and the amount of money for the buy-in.

In some embodiments, the automatically acquired facial profile and buy-in amount can be sent to a centralized server for monitoring for potential instances of money laundering purposes. If this facial profile is detected with buy-ins that exceed a certain amount, over a defined period (i.e. 24 hours), an alert may be sent out automatically. The central server may process the stored faces or send the facial profile to the other devices. The other devices can then look at their local database to see if the facial profile is detected at that table and if they had bought in for more money. If a threshold is hit, an alert may be sent to surveillance and/or some other authority/department.

In accordance with another operational example, a player is at the table and ready to play. Once at the table, whether they did a buy-in or brought chips to the table, they would place their chips in a betting area to play. It is also not uncommon for people to move from one betting area to another or to play more than one bet position. In addition to this, people may choose wait out a hand or more than one. The staff is directed to watch the players as often as they can to determine who is playing where, how much they are betting, how many hands they played, when they leave, amongst other things. As provided above, in some situations, the staff may be required to watch for such things at upwards of 8 tables at one time. Thus, determining what time someone sat down and first started playing and when the player left is difficult to determine when potentially watching 50 people at any given time. Thus, an embodiment of the present disclosure uses a watchdog process to determine if a bet position is active. The detection of a chip in the spot can be used to determine if the process is active. There are numerous methods of object detection to determine if the chip is in a betting position. If a position was previously inactive and is now is active, the following process can occur. A simple chip detect process detects a chip in a position that was previously unoccupied. A timestamp is created and the XY coordinate is detected. The chip counting process can be activated to look at upcoming frames. The chip counting process can analyze upcoming frames from either a Chip L camera or a Chip R camera and count the chips per XY position. The system can analyze both cameras streams and provide results information for the same position. This will allow for secondary vantage points for optimal analysis. The XY coordinate and timestamp information can be sent to the appendage detection process to determine who placed the currency. The appendage detection process can perform one of the following routines. It can review the buffer of the camera(s), frame by frame in reverse to determine the appendage that placed the currency. It can receive a video and process the frames from prior to the event up to the event to determine the appendage that placed the currency. Additionally or alternatively, it can back up the buffer directly and play it forward from a predetermined spot prior to the timestamp to determine the appendage that placed the currency.

Once the appendage detection process has determined the appendage, the appendage detection process or the watchdog can send images or videos in close proximity of the XY location to a facial recognition process. The facial recognition process can then determine which person is currently at the table or if they are a new face and should start a new profile. If they are an existing face it will apply the bet information to their facial profile. In accordance with various embodiments, every round that is played for every bet position can be tracked to confirm the person playing. Bets that remain from the previous round will be associated to the original owner.

The chip(s) can then be counted and the designated process can store the following information: the facial profile assigned to the chip, amount played, hand win/loss, and time of the round. The process for detecting positions played, who played them, and how often they are played can provide more exact information for the casino for complimentary offering and for understanding the utilization of their games.

In accordance with another operational example, at the beginning of a round the dealer deals the cards out. Depending on the game, the players may handle the cards or the dealer will solely handle the cards. Using computer vision and a set of rules, the system can analyze the cards that are at play on the layout and to whom these cards belong to. Detecting the values of the cards is needed to understand incorrect payouts, skill level, advantage play detection, etc. Analyzing the cards utilizing conventional optical analysis techniques can be costly from a processing standpoint. When combined with other processes it becomes even more complex. The methods described herein, however, can use a reasonable frame rate to detect play which may catch a high percentage of cards. A card placed on the table can be analyzed and provided with a certain confidence level. If a card does not have a high confidence level, which may result from the card not being visible (not enough frames with it in view), or if the system is expecting another card or a different result from what has occurred, the card process can send off a request for a card value analysis to review the past output in a video file or to review the output directly from the buffer to allow for a more thorough analysis. The post processing of this event can occur at a higher frame rate to provide better resolution. This approach allows the system to only utilize 60 FPS, as an example, when it truly needs to.

For instance, assume that a dealer and one player are at a blackjack table. The player has a 7 of hearts and a 9 of spades with a dealer up card 10 of diamonds. The dealer places a card in the player position area and then quickly picks up the chips and the cards without the system detecting the 3 card. In this example, the card value detection process detected a card but is unable to determine the value, or the system expects to detect a card (16 against a 10) and didn't receive it. In such a situation, a timestamp of when the chips were picked up can be created. The coordinates of the cards can be sent to the card counting process and a command for the card counting process to run backward at 60 FPS to see if any results can be found. The results can be applied to the system for that position/round.

Figure 8:
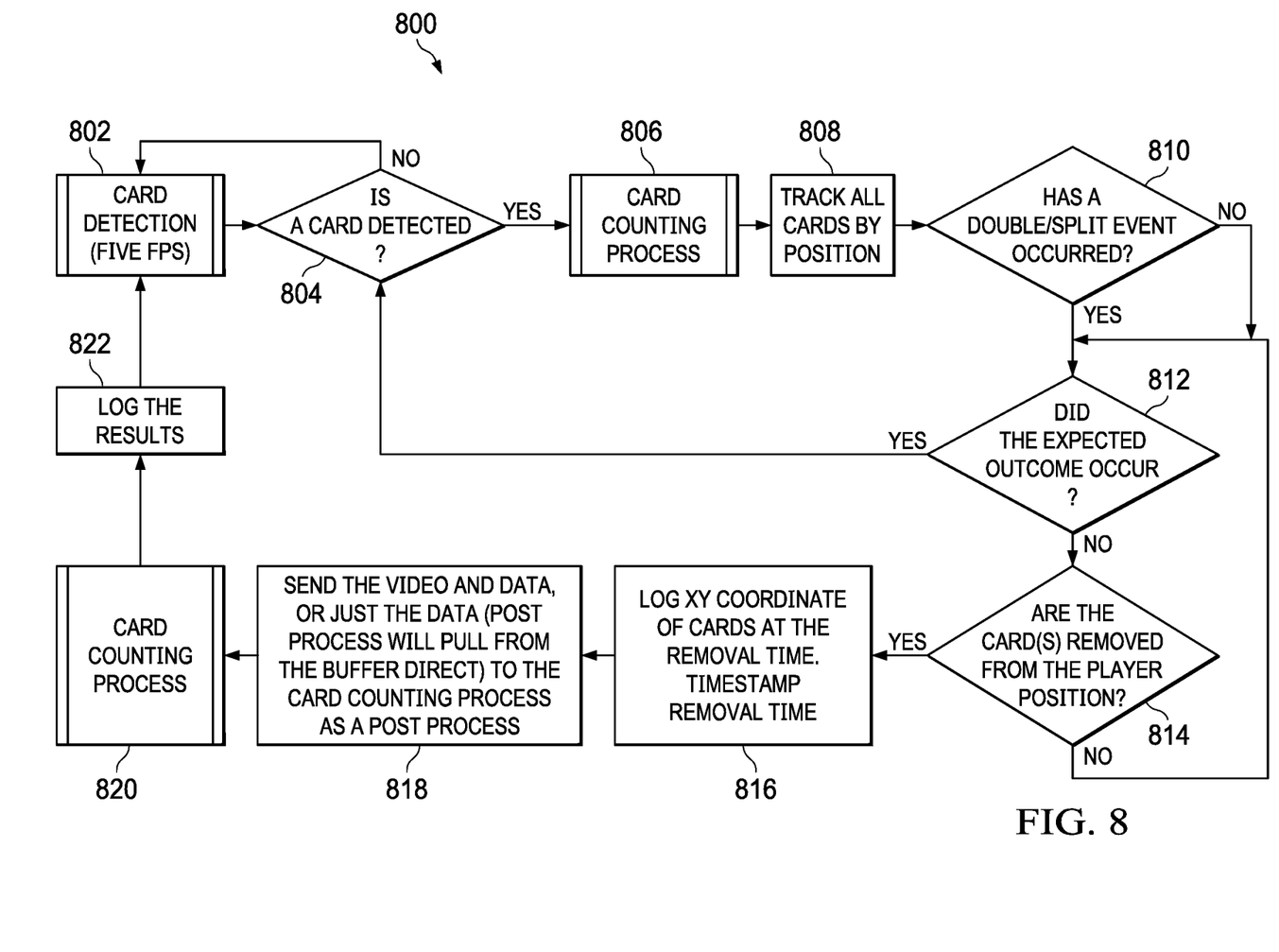
FIG. 8 depicts an example card analysis process in accordance with one non-limiting embodiment

FIG. 8 depicts an example card analysis process 800 in accordance with one non-limiting embodiment. Referring to blocks 802-804 the process waits until a card is detected before starting advanced processing. At blocks 806-812 gameplay is monitored and the expected outcome is analyzed. If the expected outcome did not occur, the process moves to blocks 814-820 for additional process. As shown, based on the coordinates of the cards at the time they were removed from the table, post facto analysis of the event can occur in order to ascertain the value of the card, relying on other routines, as may be needed. The results are logged at block 822 and the process resets to block 802.

It is noted that the post facto review process at a higher frame rate or with a higher CPU load, as shown in FIG. 8, can be used with a variety of processes described herein. The approach can also be used, for example, in particular card games where the player typically holds their cards face down for much of the gameplay and their values are only shown momentarily at the end of the hand. Further, a master time keeping process may manage these processes and their associated timestamps. The processes can also account for slight delays in image acquisition from the cameras. Further, various processes described herein can utilize the buffer, if desired. The buffers can be accessed as a cropped video or any other method for storing video. Also, each independent process may have secondary options for analysis at higher frame rates. The processes can also be configured to know what secondary streams are available. By way of example, if the primary camera is not able to detect what was expected, the executing process can use one or more buffers from the other cameras or analyze using numerous cameras in real-time to achieve the optimal result.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration of the invention for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

What is claimed is:

1. A computer-based method of detecting and tracking gameplay events at a gaming table, comprising:
   receiving, by one or more computer processors, a camera stream from each of a plurality of cameras positioned proximate to a gaming table;
   executing, by the one or more computer processors, a plurality of watchdog processes, wherein each of the watchdog processes reviews camera streams from one or more of the plurality of camera for a trigger event associated with the respective watchdog process;
   when the trigger event is detected by one of the plurality of watchdog processes, creating, by the one or more computer processors, a timestamp for the trigger event;
   identifying, by the one or more computer processors, coordinates of the trigger event relative to the gaming table;
   executing, by the one or more computer processors, an appendage detection process to associate the trigger event with a particular player at the gaming table, wherein the appendage detection process is provided coordinates of the trigger event and reviews frames of one or more of the camera streams prior to the timestamp to identify an image of a face of the player associated with the trigger event;
   executing, by the one or more computer processors, a facial recognition process on the image of the face of the player associated with the trigger event; and
   when the facial recognition process successfully identifies the player, associating, by the one or more computer processors, the trigger event with the identified player.

2. The computer-based method of claim 1, wherein one of the plurality of watchdog processes is a currency detection process.

3. The computer-based method of claim 1, wherein one of the plurality of watchdog processes is a chip detection process.

4. The computer-based method of claim 1, wherein one of the plurality of watchdog processes is a card detection process.

5. The computer-based method of claim 3, wherein execution of appendage detection process associates a bet comprising one or more chips with a player at the gaming table.

6. The computer-based method of claim 1, wherein one of the plurality of watchdog processes reviews at least one of the camera streams at a first frames per second (FPS) rate and an extended process based on the detection of a trigger event associated with one of the plurality of watchdog processes reviews at least one of the camera streams at a second frames per second (FPS) rate, wherein the second FPS rate is higher than the first FPS.

7. The computer-based method of claim 1, wherein an extended process reviews one or more of the camera streams forward from the timestamp identified by the watchdog process detecting the trigger event.

8. The computer-based method of claim 1, wherein the appendage detection process reviews one or more of the camera streams in reverse from the timestamp identified by the watchdog process detecting the trigger event.

9. The computer-based method of claim 1, wherein the appendage detection process reviews one or more of the camera streams from a buffer from the timestamp preceding a point of time identified by the watchdog process detecting the trigger event.

10. A table gaming system for a gaming environment comprising:
    a gaming table;
    a plurality of cameras positioned proximate to the gaming table;
    a computing system comprising one or more processors, the one or more processors in communication with memory that stored logic that, when executed by the one or more processors, causes the one or more processors to:
      receive a camera stream from each of a plurality of cameras positioned proximate to a gaming table;
      execute a plurality of watchdog processes, wherein each of the watchdog processes reviews camera streams from one or more of the plurality of camera for a trigger event associated with the respective watchdog process;
      when the trigger event is detected by one of the plurality of watchdog processes, create a timestamp for the trigger event;
      identify coordinates of the trigger event relative to the gaming table;
      execute an appendage detection process to associate the trigger event with a particular player at the gaming table, wherein the appendage detection process is provided coordinates of the trigger event and reviews frames of one or more of the camera streams prior to the timestamp to identify an image of a face of the player associated with the trigger event;
      execute a facial recognition process on the image of the face of the player associated with the trigger event; and
      when the facial recognition process successfully identifies the player, associate the trigger event with the identified player.

11. The table gaming system of claim 10, wherein the plurality of watchdog processes comprise any of a currency detection process, a chip detection process, and a card detection process.

12. The table gaming system of claim 10, wherein execution of the appendage detection process associates a bet comprising one or more chips with a player at the gaming table.

13. The table gaming system of claim 10, wherein the plurality of cameras comprises a first subset of cameras positioned on a first side of the gaming table and the second subset of cameras positioned on a second side of the gaming table.

14. The table gaming system of claim 13, wherein the second subset of cameras comprises at least one camera at a higher elevation than another one of the cameras.

15. The table gaming system of claim 14, wherein the least one camera at the higher elevation is a table top camera.

16. The table gaming system of claim 13, wherein one of the cameras in the first subset of cameras is a chip detection camera and another camera in the second subset of cameras is a face detection camera.

17. A computer-based method of detecting and tracking gameplay events at a gaming table, comprising:
    receiving, by one or more computer processors, a camera stream from each of a plurality of cameras positioned proximate to a gaming table, wherein the plurality of cameras comprises a first subset of cameras positioned on a first side of the gaming table and the second subset of cameras positioned on a second side of the gaming table;

executing, by the one or more computer processors, a plurality of watchdog processes, wherein each of the watchdog processes reviews the camera streams for an event, wherein the plurality of watchdog processes comprise any of a currency detection process, a chip detection process, and is a card detection process, wherein each of the watchdog processes reviews camera streams from one or more of the plurality of camera for a trigger event associated with the respective watchdog process;

when the trigger event is detected by one of the plurality of watchdog processes, creating, by the one or more computer processors, a timestamp for the trigger event;

identifying, by the one or more computer processors, coordinates of the trigger event relative to the gaming table;

executing, by the one or more computer processors, an appendage detection process to associate the trigger event with a particular player at the gaming table, wherein the appendage detection process is provided coordinates of the trigger event and reviews frames of one or more of the camera streams prior to the timestamp to identify an image of a face of the player associated with the trigger event;

executing, by the one or more computer processors, a facial recognition process on the image of the face of the player associated with the trigger event; and when the facial recognition process successfully identifies the player, associating, by the one or more computer processors, the trigger event with the identified player.

* * * * *